Patented May 18, 1926.

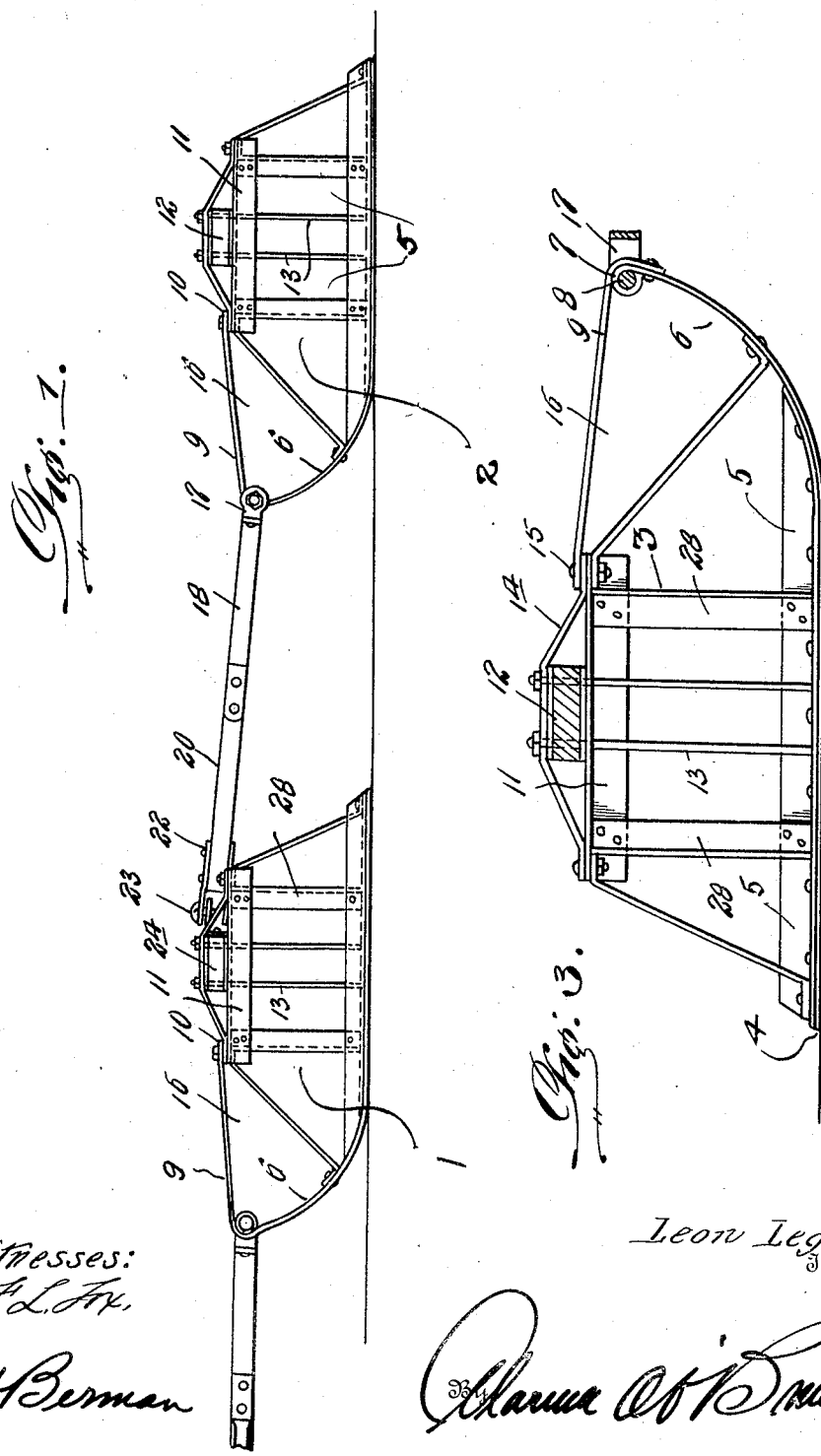

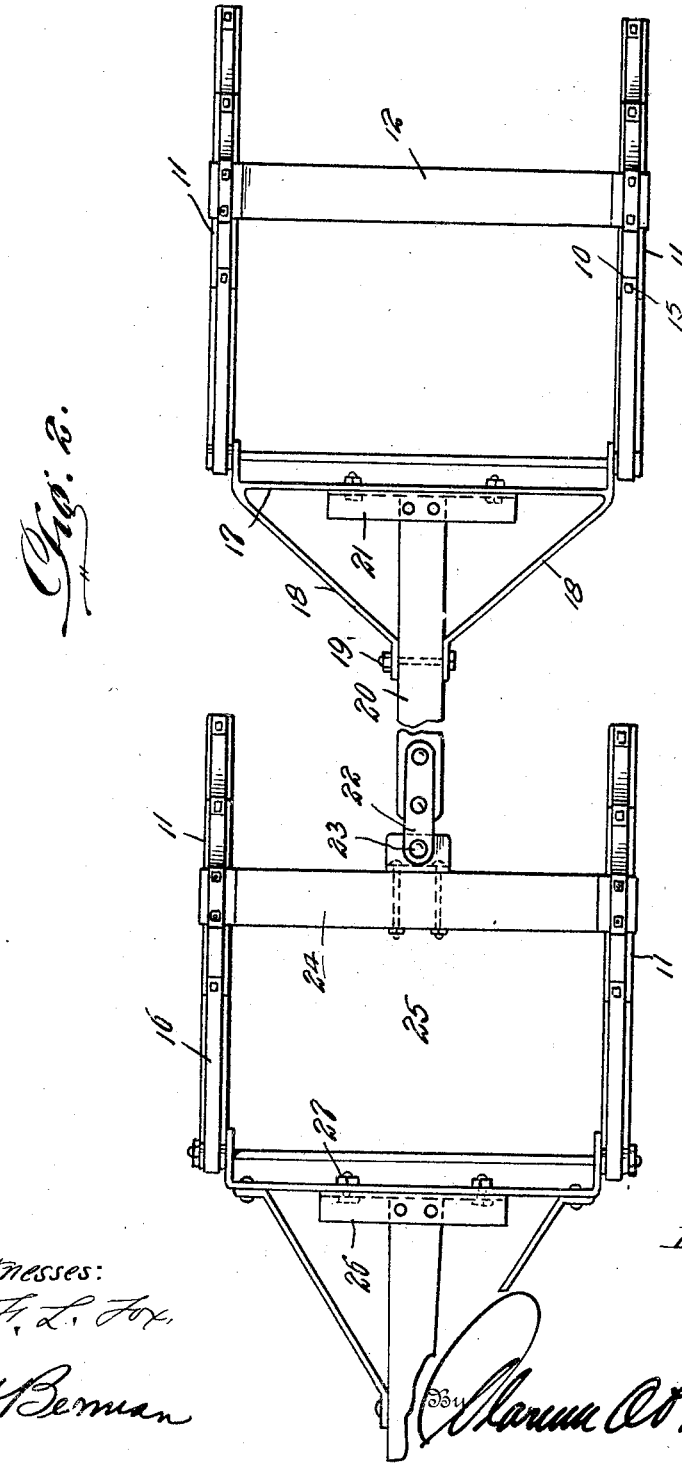

1,585,293

UNITED STATES PATENT OFFICE.

LEON LEGARE, OF HOFFMAN, MINNESOTA.

STEEL BOBSLED.

Application filed April 9, 1923. Serial No. 630,751.

This invention has reference to bob sleds constructed in the main of steel, and its object is to provide a sled composed of steel shoes having an intermediate connection permitting flexibility of draft and adapted to take any size load, and provided with an ample clearance for running through deep snow, and which is rot proof, warp proof, and essentially proof against breaking.

In accordance with the invention, the sled embodies the improvement of a front sled element and a rear sled element having a connecting pole between them, while a front pole is employed for the attachment of the draft with the poles joined to the respective sled elements by pivot connections allowing a great flexibility of junction.

Each sled element includes steel shoes with runners having a curved engaging surface with a rising forward member having at the front end a bowed junction, to which is attached a pole, by means of which the rear sled of the bob sled is joined to the front sled or member thereof with junction bars having pivot connections with the forward one of the sleds, and with the main draft pole.

The invention will be best understood from a consideration of the following detailed description taken in connection with the accompanying drawings forming part of this specification, with the understanding that the invention is not confined to any strict conformity with the showing of the drawings, but may be changed and modified, so long as such changes and modifications mark no material departure from the salient features of the invention as expressed in the appended claim.

In the drawings:—

Figure 1 is a side elevation of a bob sled including the invention.

Figure 2 is a plan view thereof, and

Figure 3 is a longitudinal front to rear section of one member of the sled.

In the drawings, there is shown a bob sled composed of two similar members 1 and 2, each being the same in the main, so that a description of one will apply equally well to the other.

Each sled element 1 and 2 comprises sides 3, each composed of side runners 4 with a series of knees 5 which may be formed of upright, angle irons riveted to side runners 4 of appropriate height, and terminating at the forward end in upturned portions 6, each terminating at the upper forward end in an eye 7 traversed by my pivot bolt 8, about which is directed a strap 9, extending rearwardly to one end of a cross bar 10, joined with the like ends of the side members of the sled shoe.

Extending lengthwise along each side of the shoe is a beam 11, which may be joined at each end by rivets to the terminal portions of the sled member, and fast on the upper end of the beam 11 is a short beam 12, traversed by elongated bolts 13, joined to the runners 6, the bolts 13 being usually of round cross section. Overriding the short beam 12 is a truss member 14, connected at the ends through the ends of the beam 11 by bolts 15.

Attached to the forward end of the rear sled member designated at 16 is a coupling 17, extending across the forward end of the rear sled, and provided with bar straps 18, connected to the end portions of the rear runners, the forward ends traversed by a bolt 18 extending through the pole 20, connected at the rear to a transverse beam 21, carrying at the forward end a link 22 joined by the single bolt 23 to a front bunk 24, by means of which the two sled units are united.

The front sled unit 25 is also provided with a cross beam 26, connected by bolts 27.

The beam 22 is connected to the forward sled unit of the front end of the beam by the coupling 23 only referred to, so that two sled units are pivotally connected to permit of variations in draft as needed.

The function between the two slot units is flexible, so that up and down movements are provided for.

The rods 13 supporting the beam 11 are assisted by angular knees 28, serving to resist the weight of the load placed upon the sled members, and thereby assist in stiffening these sled members against collapse.

Having thus described my invention, what I claim as new, and desire to secure by Letters-Patent is:—

In a sled structure, a pair of runners, bottom horizontal angle irons fixed to the runners to extend longitudinally therewith on the upper surfaces thereof, a pair of upright angle bars extending from each of the first mentioned angle irons perpendicularly thereto, a pair of top horizontal angle irons, one on each pair of the upright angle bars at the upper ends thereof and disposed to extend parallel with the bottom angle irons, a cross member connecting the top horizontal angle irons, a brace depending from the rear end of each top horizontal angle iron to the rear end of the corresponding bottom iron, the forward ends of the runners being curved upwardly, braces extending from the intermediate portions of the curved ends to the forward ends of the top horizontal angle irons, braces extending from the terminals of the curved ends to the forward ends of the top angle irons, bolts rising from the bottom horizontal angle irons, through the top horizontal angle irons and the cross member, a plurality of truss members, a pair of said truss members engaged with the ends of each top horizontal angle iron and extending over the cross member, said bolts piercing the truss members, and nuts engaged on the upper ends of said bolts for holding said truss members and said cross member on said top horizontal angle irons.

In testimony whereof I affix my signature.

LEON LEGARE.